Figure 1:
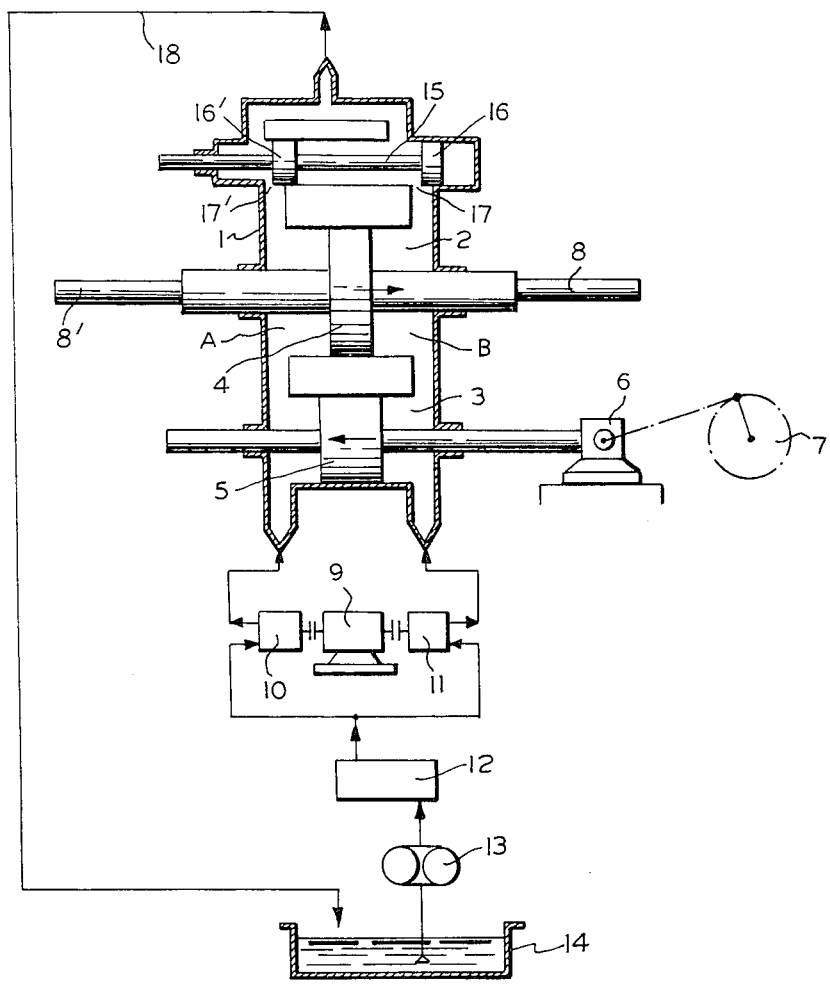

United States Patent

Strebel et al.

[15] 3,653,211

[45] Apr. 4, 1972

[54] HYDRAULIC POWER TRANSMISSION

[72] Inventors: Albert Strebel, Binningen; Konrad Scheuber, Basel, both of Switzerland

[73] Assignee: Maschinenfabrik Burckhardt AG, Basel, Switzerland

[22] Filed: June 9, 1970

[21] Appl. No.: 44,695

[30] Foreign Application Priority Data

June 12, 1969 Switzerland ..........................9003/69

[52] U.S. Cl. ...............................60/54.5 R, 60/1, 417/385
[51] Int. Cl. .............................................F15b 7/00
[58] Field of Search ..........................60/54.5, 1; 91/51, 399; 417/388, 385

[56] References Cited

UNITED STATES PATENTS

| | | | |
|---|---|---|---|
| 2,585,389 | 2/1952 | Kehrl | 60/54.5 R |
| 3,314,366 | 4/1967 | Bauer | 60/54.5 |
| 3,538,814 | 11/1970 | Fisher | 91/51 |
| 3,511,582 | 5/1970 | Bauer | 60/54.5 |
| 1,782,975 | 11/1930 | Schaer | 417/385 |

Primary Examiner—Martin P. Schwadron
Assistant Examiner—A. M. Zupcic
Attorney—Wenderoth, Lind & Ponack

[57] ABSTRACT

The invention concerns hydraulic power transmission or conversion between a crank-driven, double-acting primary cylinder and a similar secondary cylinder and provide for avoidance of the danger of cavitation, as a result of hydraulic fluid pressure falling below vapour pressure, by regulation of the feed pressure and of the arithmetic mean of the respective upper and lower pressures in the loaded and non-loaded working chambers, so that the lower pressure will not fall below the vapour pressure, even taking account of possible pressure oscillations. The invention extends both to methods of transmission and conversion and to devices wherein the same may be effected.

17 Claims, 2 Drawing Figures

INVENTORS
ALBERT STREBEL
KONRAD SCHEUBER

BY *Wenderoth, Lind & Ponack*
ATTORNEYS

HYDRAULIC POWER TRANSMISSION

The invention relates to a process and a device for the feeding of the power transmission fluid into the reciprocating piston engine of an hydraulic power transmission device having hydraulic transmission (or conversion) of the piston movement, between a crank driven, double-acting primary cylinder and a secondary cylinder.

For controlling the possibly high piston forces set up during the operation of reciprocating piston pumps, hydraulic transmission means are frequently used in constructions involving horizontally opposed working cylinders. This has the advantage that the reciprocating motion can be imparted to the two working pistons with a shorter stroke and under the influence of extremely high piston forces, by way of a relatively long-stroke crank drive, the forces of which are within conventional limits.

In this connection, designs are known wherein the hydraulic fluid serving for energy transmission is fed to the working chambers of the hydraulic system, for the purpose of diminishing the heating which takes place, continuously and by means of preconnected, volumetric filling pumps, out of the liquid tank at an adjustable, low supply or inlet pressure (for example 5–20 kg./cm.²).

The inflow of the hydraulic transmission fluid, for example hydraulic oil, into the two working chambers of the hydraulic system determined by the piston stroke or travel takes place, with these arrangements, through a non-return valve disposed at the lowest position in each particular case, whereas the outflow takes place through a non-return valve arranged at the uppermost position in each particular case. The adjustment of the initial flow pressure is effected with a pressure reducing device arranged in the discharge conduit leading to the liquid tank, after the uppermost non-return valve of the two working chambers.

On operation of the machine, passage of hydraulic transmission fluid through the opened lower and upper non-return valve is possible only through the particular non-loaded cylinder side, whereas on the loaded cylinder side the pressure produced by operation in the transmission fluid puts the lower and upper non-return valve into the closed position so that the fluid pressure necessary for the operation of the working pistons is able to build up proportionally to the working piston force resulting from the pressure difference within the system.

In these known hydraulic systems, considerable disturbance may be caused by cavitation resulting from the formation of vapour bubbles in the hydraulic transmission fluid during the suction stroke. This is particularly the case if the pressure oscillations set up during opening action of the lower non-return valve in the suction stroke of the primary piston, lead to pressure minima below the vapour pressure of the hydraulic transmission fluid leading to the formation of vapour bubbles.

Under these circumstances, there is a danger that on the pressure increasing, at the especially favoured locations within the hydraulic system, due to a sudden collapse of the liquid vapour bubbles (implosion) there may be set up in the vicinity of the wall stresses which the material is not able to withstand and, at the same time, there may be detached out of the surface metal particles which are washed away with the hydraulic fluid. On initiation of the implosion process, there are then formed on the wall the much feared, crater-shaped erosion cavities which may result in destruction of the machine part.

Thus, it is a primary object of the invention to solve the problem of providing a process and a device of the type mentioned at the outset, wherein the danger of the operating hydraulic pressure falling below the vapour pressure of the power transmission fluid, and the attendant and detrimental cavitation effect, on operation of the device, is obviated.

In a process in accordance with the invention power transmission fluid is fed into working chambers arranged on opposite sides of a primary and a secondary piston and determined by the effective faces of those pistons and connecting the associated primary and secondary cylinders, at such a pressure and the arithmetic mean formed from the upper pressure obtaining in the loaded working chamber and the lower pressure obtaining in the non-loaded working chamber is so adjusted that with the pressure difference remaining constant the lower pressure is, taking possible pressure oscillations into consideration, above the vapour pressure of the power transmission fluid, the mean pressure being adjusted, by means of a throttle associated with one of the working chambers and consisting of two throttle cross-sections, in dependence on the rates of feed of power transmission fluid in each particular case into the two working chambers by two high-pressure pumps.

Figure 2:
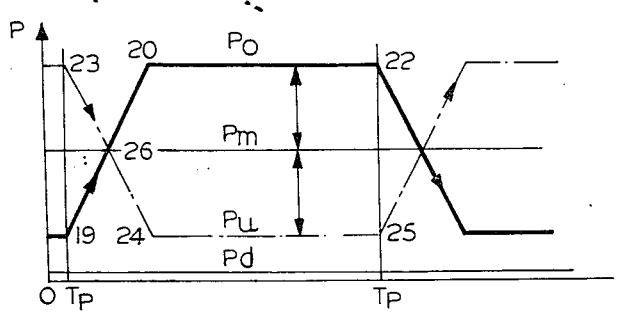

In order that the invention may be thoroughly understood a device in accordance with it and the operating process of the same will be described in some detail, by way of example, with reference to the accompanying drawings, in which:

FIG. 1 is a diagram of the hydraulic system showing the arrangement of the hydraulic fluid feed means; and FIG. 2 is a diagram illustrating the theoretical pressure development of the hydraulic fluid during operation of the device.

The hydraulic system 1 shown in FIG. 1 consists of a primary cylinder 3 in which the primary piston 5, driven by a crank drive 7 and a crosshead 6, is longitudinally reciprocated with a relatively long stroke.

Under the influence of the hydraulic transmission fluid, a secondary piston 4 in a secondary cylinder 2 is displaced driving the working pistons 8 and 8' which are secured at both sides. Because the secondary piston 4 has a larger effective piston surface than the primary piston 5, hydraulic transmission or conversion of the movement takes place. The stroke of the secondary piston 4 becomes smaller and it becomes possible to produce considerably larger forces. As may be seen from FIG. 1, the continuous inflow of the hydraulic fluid into the two working chambers A and B of the hydraulic system is produced by a separate high-pressure pump 10 and 11 in each particular case, both pumps having the same delivery and being designed for example as high-pressure axial piston pumps.

The flow-away of the hydraulic fluid out of the working chambers A and B of the hydraulic system takes place at the highest point, by way of two idential fixedly adjustable throttle cross-sections 17 and 17' defined for example (as shown) by the position of a throttle valve 15 having sliding pistons 16 and 16' fixed to one another. The two throttle cross-sections 17 and 17' are adjusted to be so small that (as explained later) the mean pressure $P_m$ is produced. The hydraulic fluid flowing through the two throttle cross-sections 17 and 17' flows by the pipeline 18 back into the fluid tank 14.

The two high-pressure pumps 10 and 11 must feed the same fluid volume into the working chambers A and B and are therefore expediently driven at the same speed. This may be done for example by using an electric motor having a drive shaft extending through at both end faces and both ends of which are designed as drive journals. Of course, also other possibilities for achieving the necessary speed uniformity are available and known.

The same effect can also be achieved if the hydraulic transmission or conversion fluid is fed into the working chambers A and B with two separately driven high-pressure pumps having differing delivery volumes per rotation. In this case, in order to achieve the necessary mean pressure $P_m$ either, with identical throttle cross-sections 17 or 17', the particular pump speed must be adapted or, with the speed unchanged, the particular throttle cross-section 17 or 17' must be separately adjusted (not shown in the drawings).

It is also within the scope of the invention if the infeed of the hydraulic transmission fluid into the chambers A and B takes place through two separate high-pressure pumps 10 and 11 having an infinitely variable delivery volume and the discharge flow or flow-off takes place by two fixed, non-adjustable throttle cross-sections 17 and 17' associated with the chambers A and B. In this case, the delivery volume adjusted at both high-pressure pumps (not shown in the drawings) is decisive for the value of the mean pressure.

The hydraulic fluid is fed to the two high-pressure pumps 10 and 11 out of the fluid tank 14, by a volumetric pump 13 common to both or arranged separately for each high-pressure pump, the working heat contained in the inflowing hydraulic fluid being removed by way of a heat exchanger 12 arranged between the volumetric pump 13 and the high-pressure pumps 10 and 11. Non-return valves for the inflow and outflow of the hydraulic fluid may be dispensed with, with this arrangement.

On generating the pressure in operation, on the loaded side of the primary piston 5 (as shown in FIG. 1) during movement of the piston from right to left on the side of the working chamber A, the oil volume of the primary cylinder 3 determined by the stroke of the primary piston 5 is pressed into the secondary cylinder 2, the secondary piston 4 and therewith the working pistons 8 and 8' being displaced towards the right. At the same time, over the entire stroke, the hydraulic force is in equilibrium with the force resulting from the medium pressure difference on the two working pistons 8 and 8'. Due to the pressure increase, the effective fluid volume is diminished by a predetermined amount $\Delta V$ in the loaded work chamber A due to compressibility of the hydraulic fluid. Correspondingly, in the non-loaded work chamber B the effective hydraulic fluid volume is enlarged by the same amount $\Delta V$, thus producing expansion of the fluid at this side. Since the compressibility of the hydraulic fluid, in the case of the pressure range concerned, develops linearly or substantially linearly, the pressure developments on the loaded and unloaded piston side are symmetrical relative to the mean pressure $Pm$ adjustable by means of the throttle device 15.

Illustration of the pressure development in the pressure/time diagram according to FIG. 2, in which:

$Pm$ = the mean pressure to be adjusted;
$Pu$ = the pressure of the hydraulic fluid on the load-relieved piston side;
$Po$ = the pressure of the hydraulic fluid on the loaded piston side;
$Pd$ = the steam pressure of the hydraulic fluid; and
$Tp$ = the dead-centre in the piston end position.

Referring to the diagram according to FIG. 2, the full line 19 – 26 – 20 – 22 determines the pressure development of the hydraulic fluid in the loaded working chamber A on movement of the primary piston 3 from right to left, and the dot-dash line 23 – 26 – 24 – 25 determines the simultaneous pressure development of the hydraulic fluid in the unloaded working chamber B. The compression line 19 – 20 and the expansion lines 23 – 24 intersect at point 26. At this point, there obtain in the working chambers A and B identical pressures the value of which is determined by the mean pressure $Pm$ adjustable by means of the throttle device 15. On operation of the primary piston 3, the difference $x$ between the working pressure $Po$ in the loaded working chamber A relative to the mean pressure $Pm$ is equal to the difference $x$ between the mean pressure $Pm$ and the lower pressure $Pu$ in the unloaded working chamber B.

The advantage of the arrangement is that the mean pressure $Pm$ may be adjusted, by means of the throttle device 15, to be so high that, with the fluid pressure difference $Po - Pu$ remaining constant, the lower pressure $Pu$ is situated, taking possible pressure oscillations into consideration, with sufficient certainty above the vapour pressure $Pd$ associated with the transmission fluid, whereby cavitation effect, with all its harmful consequences, is completely eliminated.

In this connection, it is a further advantage that it is unnecessary to provide, for the circulation in the hydraulic system, non-return valves which cause vigorous pressure surges and, as wear elements, may suffer breakdown. Furthermore, the elimination of the pressure surges results in smoother running of the machine.

In order to avoid the detrimental influences on the high-pressure pumps 10 and 11 which could be caused by air bubbles present in the inflowing hydraulic fluid, the inflow pressure into the high-pressure pumps 10 and 11 is brought to a predetermined level by means of the volumetric pump 13. In this way, air bubbles present in the hydraulic fluid flowing in out of the fluid tank 14 are, after the volumetric pump 13, due to operation of turbulence and inadequate period of stay, absorbed in the hydraulic fluid. The period of stay is lengthened by the liquid volume of the heat exchanger 13 arranged between the two pump groups, in this way increasing the efficacy of absorption.

We claim:

1. A process for feeding the power transmission fluid into the reciprocating piston engine of an hydraulic power transmission device having hydraulic transmission or conversion of the piston movement between a crank driven, double-acting primary cylinder and a secondary cylinder comprising feeding a power transmission fluid into working chambers arranged on opposite sides of a primary piston and a secondary piston determined by the effective faces of said pistons, connecting the associated primary and secondary cylinders, at such a pressure, with the arithmetical mean formed from the upper pressure obtaining in the loaded working chamber and the pressure obtaining in the unloaded working chamber are so adjusted, so that with the pressure difference remaining constant the lower pressure is, taking possible pressure oscillations into consideration, above the vapor pressure of the power transmission fluid, adjusting the mean pressure by means of a throttle device consisting of two throttle cross-sections associated with said working chambers in dependence on the rate at which the power transmission fluid is fed in each particular case into said working chambers by high-pressure pumps.

2. A process according to claim 1 wherein said mean pressure is adjusted by correspondingly adjusting two identical-value throttle cross-sections and feeding the rates of fluid into said two working chambers at equal speeds of the high-pressure pumps at equal and constant value.

3. A process according to claim 1 wherein said mean pressure is adjusted by correspondingly adjusting two equal-value throttle cross-sections so that with unequal speed of said high-pressure pumps, the rate of feed into said two working chambers are of equal and constant value, operating the high-pressure pump at the lower speed with a larger delivery volume and operating the high-pressure pump at the higher speed with a smaller delivery volume.

4. A process according to claim 1 wherein said mean pressure is adjusted by correspondingly adjusting two unequal throttle cross-sections so that the adjusted feed rates to both of said working chambers in the case of equal or unequal speed of said high-pressure pumps are of differing but constant value.

5. A process according to claim 1 wherein said mean pressure is adjusted by varying the rates of feed to said two working chambers from said two high-pressure pumps and holding said throttle cross-sections of equal non-adjustable value.

6. A process according to claim 5 wherein said power transmission fluid flows out of said two working chambers with a build-up of pressure, and passing said fluid in each particular case through a separate throttle device having a fixedly adjustable throttle cross-section.

7. A power transmission device comprising a primary cylinder having a primary piston, a secondary cylinder connected with said primary cylinder having a secondary piston, working chambers in said cylinders on both sides of said pistons, means feeding transmission fluid into said working chambers under a pressure determined by the effective surfaces of said primary piston and said secondary piston, and means adjusting the arithmetical mean pressure formed from the upper pressure obtaining in the loaded working chamber and the lower pressure obtaining in the non-loaded working chamber so that with the pressure difference remaining constant the lower pressure is situated, taking possible pressure oscillations into consideration, above the vapour pressure of the power transmission fluid.

8. A device according to claim 7 wherein two high-pressure pumps are provided and a throttle device for adjusting said mean pressure comprising two throttle cross-sections associated with said working chambers in dependence on the rate of feed of power transmission fluid by said two high-pressure pumps into said working chambers.

9. A device according to claim 8 wherein said two throttle cross-sections are of identical value and are adjustable as to value, and in which said two high-pressure pumps operate at equal speed and the rate of feed of fluid into both working chambers are of equal and constant value.

10. A device according to claim 8 wherein said two throttle cross-sections are of equal and adjustable value, and said two high-pressure pumps operate at different speeds, the high-pressure pump of lower speed having the larger delivery volume and the high-pressure pump of higher speed having the smaller delivery volume, so that the feed rates into said working chambers are of equal and constant value.

11. A device according to claim 8 wherein said two throttle cross-sections are not of equal value but are adjustable as to value, and with equal or unequal speed of said high-pressure pumps, the rates of feed into said working chambers being of unequal but constant value.

12. A device according to claim 8 wherein means are provided for feeding the volumes adjustably into said working chambers by said high-pressure pumps and said two throttle cross-sections are of equal but not adjustable value.

13. A device according to claim 8 wherein said two throttle cross-sections are adjustable and are of equal value in each adjusted position.

14. A device according to claim 8 wherein said two throttle cross-sections are adjustable but differ from each other as to value in each adjusted position.

15. A device according to claim 8 wherein said two throttle cross-sections are non-adjustable.

16. A device according to claim 8 wherein a volumetric pump is provided and the power transmission fluid flowing into said two high-pressure pumps is brought to initial inflow pressure by means of said volumetric pumps.

17. A device according to claim 16, wherein a heat exchanger is arranged between said high-pressure pumps and said volumetric pump.

* * * * *